March 13, 1973 SHIZUO NAKAGAMI 3,720,522

DRESSING CONTAINER ASSEMBLY

Filed Oct. 16, 1970

INVENTOR
Shizuo Nakagami

BY Wenderoth, Lind & Ponack

ATTORNEY

United States Patent Office 3,720,522
Patented Mar. 13, 1973

3,720,522
DRESSING CONTAINER ASSEMBLY
Shizuo Nakagami, 7-26, 1-chome Shimomae,
Toda, Japan
Filed Oct. 16, 1970, Ser. No. 81,291
Int. Cl. B65b 29/10
U.S. Cl. 99—171 CP
2 Claims

ABSTRACT OF THE DISCLOSURE

This invention relates to the construction of a capsule type dressing container assembly comprising an integral combination of a container containing salad oil and a container containing a spice-vinegar mixture, in which when it is desired to serve dressing, a partition between said containers is broken away with a single finger to allow inter-mixture of the contents in the containers. The container assembly is then shaken to sufficiently mix up the contents, whereby desired salad dressing is prepared instantly.

BRIEF DESCRIPTION OF THE INVENTION

This invention relates to the construction of a capsule type dressing container assembly comprising an integral combination of a container containing salad oil and a container containing a spice-vinegar mixture, in which when it is desired to serve dressing, a partition between said containers is broken away with a single finger to allow inter-mixture of the contents in the containers. The container assembly is then shaken to sufficiently mix up the contents, whereby desired salad dressing is prepared instantly.

OBJECTS OF THE INVENTION

Beside dressing, various other materials such as mayonnaise, table salt, vinegar and so forth are used as seasonings for salad. Among these, dressing is most inconvenient to use. It is troublesome to blend salad oil, vinegar, spice, etc., at correct proportions. Further, such dressing, once prepared, is usually subject to change in taste in about half a day and can not keep long.

The object of the present invention is to provide a container assembly which eliminates such inconvenience and which enables it to easily and instantly prepare fresh dressing whenever so desired.

DETAILED DESCRIPTION OF THE INVENTION

The above-said object and advantages of the present invention will become more apparent from the following detailed description and the drawings embodying the present invention.

Figure 1:
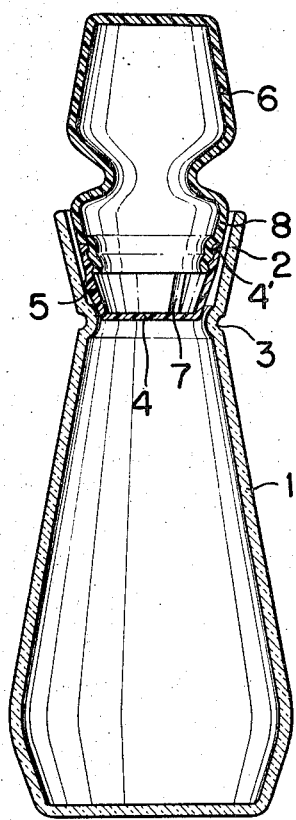
FIG. 1 is a front sectional view of the present container assembly in a state before use.
Figure 2:
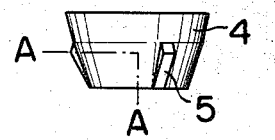
FIG. 2 is a front view of the cap 4.
Figure 5:
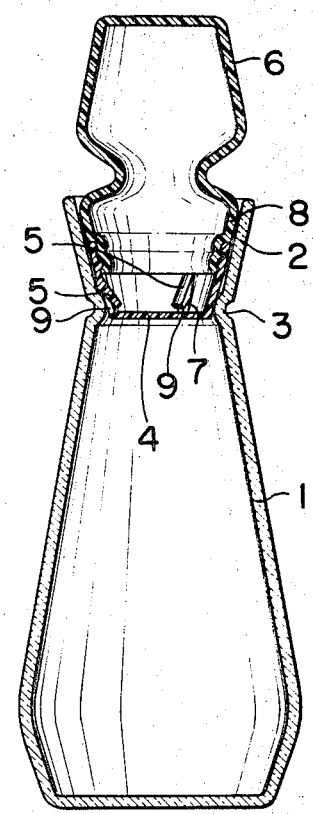
FIG. 5 is a front sectional view of the present container assembly in use.
Figures 3, 4:
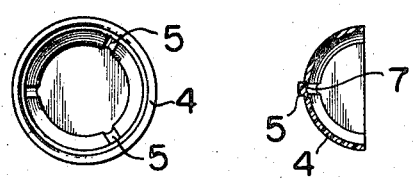
FIG. 3 is a top view of the cap 4.
FIG. 4 is a top sectional view as taken along the line A—A of FIG. 2.

As will be seen in FIG. 1, the opening portion or mouth 2 of the salad oil container 1 is cone-shaped tapering downwardly, and at the bottom of the cone is formed a constricted part 3. The container 1 may be formed by a hollow molding process with glass, porcelain or other oil-proof plastic material such as hard vinyl chloride. In any case, the constricted part 3 must be so made as to have sufficient rigidity. The spice-vinegar container 6 has a cone-shaped opening portion 8 which converges downwardly, and the bottom end thereof is opened. The taper of this cone is congruent to that of the cone shape of the opening portion of the container 1. It will be also noted that a cup-shaped cap 4 made of soft high pressure process polyethylene or the like is fitted at the bottom of the spice-vinegar container 6. The upper part of the cap 4 is also cone-shaped with a taper congruent to that of the cone-shaped opening portion of the container 6, and several (two in the shown embodiment) circular projections or ridges 4' are formed along the inside of said cone-shaped part of the cap. It is to be also noted that several (two in the shown embodiment) circular recessions, adapted to fit with said projections, are formed around the outer periphery of a lower part of the opening portion 8 of the spice-vinegar container 6. When the opening portion 8 of the container 6 is forced into the inside of the cap 4, the projections 4' on the inside of the cap 4 are fitted in the corresponding recessions on the outside of the lower part of the opening portion 8 of the container 6, whereby said container 6 and cap 4 are tightly secured to each other. As shown in FIG. 2, several (three in FIG. 3) protuberances 5 are formed around the side of the cap 4. These protuberances are so adapted that, when the container 6 is inserted into the container 1 as shown in FIG. 1, said protuberances will hit the constricted part 3 and be stopped thereby so as to hold back the container 6 from further ingress into the container 1. It should be noted that the side portion 7 of the cap 4 that surrounds each protuberance 5 is extremely thin as shown in FIG. 4. The spice-vinegar mixture container is formed by hollow molding with hard vinyl chloride, medium or low pressure process polyethylene or the like, with the opening portion 8 thereof being of a thickness having sufficient rigidity.

Now the use of the device according to the present invention will be described. The user buys a container 6 which is filled with a predetemined amount of mixture of vinegar and one or more of various types of spices and which is sealed with a cap 4. Then salad oil is put into a salad oil container 1. When it is desired to prepare and serve dressing, the user inserts the container 6 into the container 1 in the manner shown in FIG. 1 and then forcefully pushes down the container 6, whereby the protuberances 5 of the cap 4 are forced down to hit the constricted part 3 and try to get over it. Consequently, said protuberances are firmly pressed inwardly by said constricted part until finally the thinned portions 7 around the protuberances 5 are broken and the protuberances 5 pass into the inside, thus forming the holes 9 at the parts of the cap side where the protuberances 5 existed, and at the same time the opening portions 2 and 8 of the containers 1 and 6 are tightly attached to each other. The vinegar-spice mixture flows out through the holes 9 formed in the cap 4 into the salad oil in the container 1. The user then shakes the container assembly so as to sufficiently mix up the materials, whereby desired salad dressing for one serving is prepared on the spot. Since the opening portions 2 and 8 of both containers 1 and 6 are sealingly fitted to each other, no leakage of the fluid in the inside is caused by the shaking of the containers. The thus prepared salad dressing may be served on the table in the form as it is contained in the assembly of both containers 1 and 6 joined together. The container 6 can serve as a crown cap for the container 1.

Thus, according to the present invention, since salad oil and spice-vinegar mixture are separately contained in the respective containers normally separated by a partition, there is no fear of causing change in taste or quality, and desired salad dressing can be prepared instantly whenever so desired. Further, if the user buys and keeps on hand a salad oil container 1 for the exclusive use as shaker, it may be repeatedly used for each preparation of salad dressing only by buying only a container 6 containing spice-vinegar mixture. It is thus possible to enjoy the taste of fresh salad dressing at low expense, whenever so desired, without the troublesome preparation thereof.

What I claim is:

1. A container assembly comprising:

a first container (1) adapted to contain a first fluid material and having an open mouth portion (2) at one end thereof, said mouth portion being outwardly flared away from said first container (1) and having an annular constricting part (3) projecting inwardly from the inner surface thereof;

a second container (6) adapted to be inserted into the mouth portion (2) of said first container (1) and further adapted to contain a second fluid material, said second container (6) also having a mouth portion (8) at one end thereof;

a seal cap (4) fixedly attached to and closing said mouth portion (8) of said second container (6), said seal cap (4) having a side wall and at least one protuberance (5) projecting outwardly from the outer surface of said side wall, said at least one protuberance (5) being adapted to be engaged by said constricting part (3) when said second container (6) is inserted into the mouth (2) of said first conatiner (1), the thickness of said side wall where said at least one protuberance (5) is located being considerably thinner than the remaining areas of said side wall;

whereby when said second container (6) is forcibly inserted into the mouth (2) of said first container (1), said constricting part (3) engages said at least one protuberance (5) and forces the same inwardly to break the thinned portion (7) of said wall, thus allowing the interior of said second container to communicate with the interior of said first container.

2. A container assembly as claimed in claim 1 wherein said first container contains salad oil and said second container contains a spice-vinegar mixture.

References Cited

UNITED STATES PATENTS

| | | | |
|---|---|---|---|
| 3,326,400 | 6/1967 | Nameun et al. | 215—6 |
| 2,557,648 | 6/1951 | Gerson | 215—6 |
| 3,599,838 | 8/1971 | LaVange | 215—6 X |
| 3,443,726 | 5/1969 | Muller et al. | 206—47 A X |
| 3,439,823 | 4/1969 | Morane | 215—6 |

FOREIGN PATENTS

| | | |
|---|---|---|
| 1,932,783 | 2/1970 | Germany. |
| 303,806 | 1/1930 | Great Britain. |

TIM R. MILES, Primary Examiner

S. L. WEINSTEIN, Assistant Examiner

U.S. Cl. X.R.

99—171 C; 206—47 A; 215—6